US 6,712,428 B2

(12) United States Patent
Moreschi

(10) Patent No.: US 6,712,428 B2
(45) Date of Patent: Mar. 30, 2004

(54) RECLINING DEVICE FOR CHAIRS AND CHAIR WITH SAID RECLINING DEVICE

(75) Inventor: Sergio Moreschi, Brescia (IT)

(73) Assignee: CO.FE.MO.S.p.A. (IT)

( * ) Notice: Subject to any disclaimer, the term of this patent is extended or adjusted under 35 U.S.C. 154(b) by 0 days.

(21) Appl. No.: 10/131,120

(22) Filed: Apr. 24, 2002

(65) Prior Publication Data

US 2003/0001417 A1 Jan. 2, 2003

(30) Foreign Application Priority Data

Apr. 27, 2001 (EP) .......................................... 01830279

(51) Int. Cl.⁷ ............................................... A47C 10/32
(52) U.S. Cl. ............................... 297/303.4; 297/300.5; 297/303.5; 297/300.8
(58) Field of Search .......................... 297/300.5, 301.4, 297/302.4, 303.4, 217.2

(56) References Cited

U.S. PATENT DOCUMENTS 5,397,165 A 3/1995 Grin et al.
6,213,552 B1 4/2001 Miotto

FOREIGN PATENT DOCUMENTS

DE 199 22 442 A 1 11/2000
EP 0 901 763 A2 3/1999

*Primary Examiner*—Peter M. Cuomo
*Assistant Examiner*—Stephen D'Adamo
(74) *Attorney, Agent, or Firm*—James B. Conte; Barnes & Thornburg

(57) ABSTRACT

It is provided for a reclining device for chairs and the chair with said reclining device, comprising an elastic element with linear strain (8) having a first end (8a) abutting against the primary body (2) of a chair, and a half-shell element (12) adapted to house at least a portion of the elastic element (8) starting from a second end (8b) of the latter, said half-shell element (12) having two abutment portions (12b) for a pair of pushing extensions (13) integral with the support element (4) of the reclining back.

12 Claims, 4 Drawing Sheets

RECLINING DEVICE FOR CHAIRS AND CHAIR WITH SAID RECLINING DEVICE

BACKGROUND OF THE INVENTION

The present invention relates to a mechanism of elastic prop for reclining portions of office chairs and the like.

As is known, office chairs generally have portions with adjustable height and/or inclination.

In particular, they can be adjusted in the inclination of the back, and sometimes of the seat as well.

In the latter case the seat can be wholly integral with the back, so that both can incline together of the same angle, or the seat can be only partially connected with the back so as to incline less than the latter.

Chairs of the above-mentioned kind should normally be provided with mechanisms of elastic prop for reclining portions, which can exert on said portions reaction forces opposed to those developed against said portions by the user's body.

Moreover, said chairs usually consist of a primary body, for instance box-shaped, adapted to be engaged with an upper end of an upright defining a vertical stand for an office chair.

A support element of the back is turnably engaged with the primary body around an oscillation axis, so as to enable the adjustment of the inclination of said back. At least a support element of the seat of the chair is located above the primary body.

The mechanism of elastic prop is generally placed between said primary body and said support element and comprises at least an elastic element with linear strain, such as for instance a cylindrical helical compression spring, having a main direction of development which is perpendicular to the oscillation axis of said support element and a first end which abuts against the primary body.

Moreover, the mechanism of elastic prop comprises means to transfer to the elastic element the pressing force pushing the back backwards, said means being placed between the support element and a second end of said elastic element.

In practice, in the known technique said transfer means normally consist of a part of the above-mentioned support element arranged outside said second end of the elastic element, so as to abut against said second end.

The known technique, briefly disclosed above, is disadvantageous because it makes it necessary to place the elastic element in a given position, for instance in a position close to the front edge of the chair, since the above-mentioned second end of said elastic element should not be placed in such an inner position to be in contact with the pushing portion of the support element.

In practice, the primary body of the chair does not often have a suitable front space which can house the group for the adjustment of the elastic force of the elastic element with linear strain and which can be easily handled from outside.

In some technical applications the length of the elastic element and the need to compress it on its ends makes it necessary to place it in an inclined, almost vertical position, thus giving rise to quite bulky and high primary bodies of the chair.

BRIEF SUMMARY OF THE INVENTION

In this situation the technical task of the present invention is to provide for a reclining device for chairs and a chair with said reclining device which can substantially obviate said disadvantages.

Within said technical task an important purpose of the present invention is to provide for a reclining device for chairs and a chair with said reclining device which enables the maximum freedom in the design of a wide range of technical solutions, allowing for instance to place the elastic element horizontally and/or in a withdrawn position with respect to the front edge of the seat or anyway in the position which is deemed as most suitable from a functional point of view, also considering the chair comfort and the easy handling of its adjustments.

A final technical purpose of the present invention is to provide for a reclining device for chairs and a chair with said reclining device which can be easily carried out with limited costs.

BRIEF DESCRIPTION OF THE SEVERAL VIEWS OF THE DRAWINGS

The technical task and the purposes indicated above are substantially reached by a reclining device for chairs and a chair with said reclining device comprising one or more of the technical solutions claimed later.

The description of a preferred though not exclusive embodiment of a reclining device for chairs according to the invention is now disclosed as a mere non-limiting example, as shown in the enclosed drawings, in which.

DETAILED DESCRIPTION OF THE INVENTION

Figure 1:
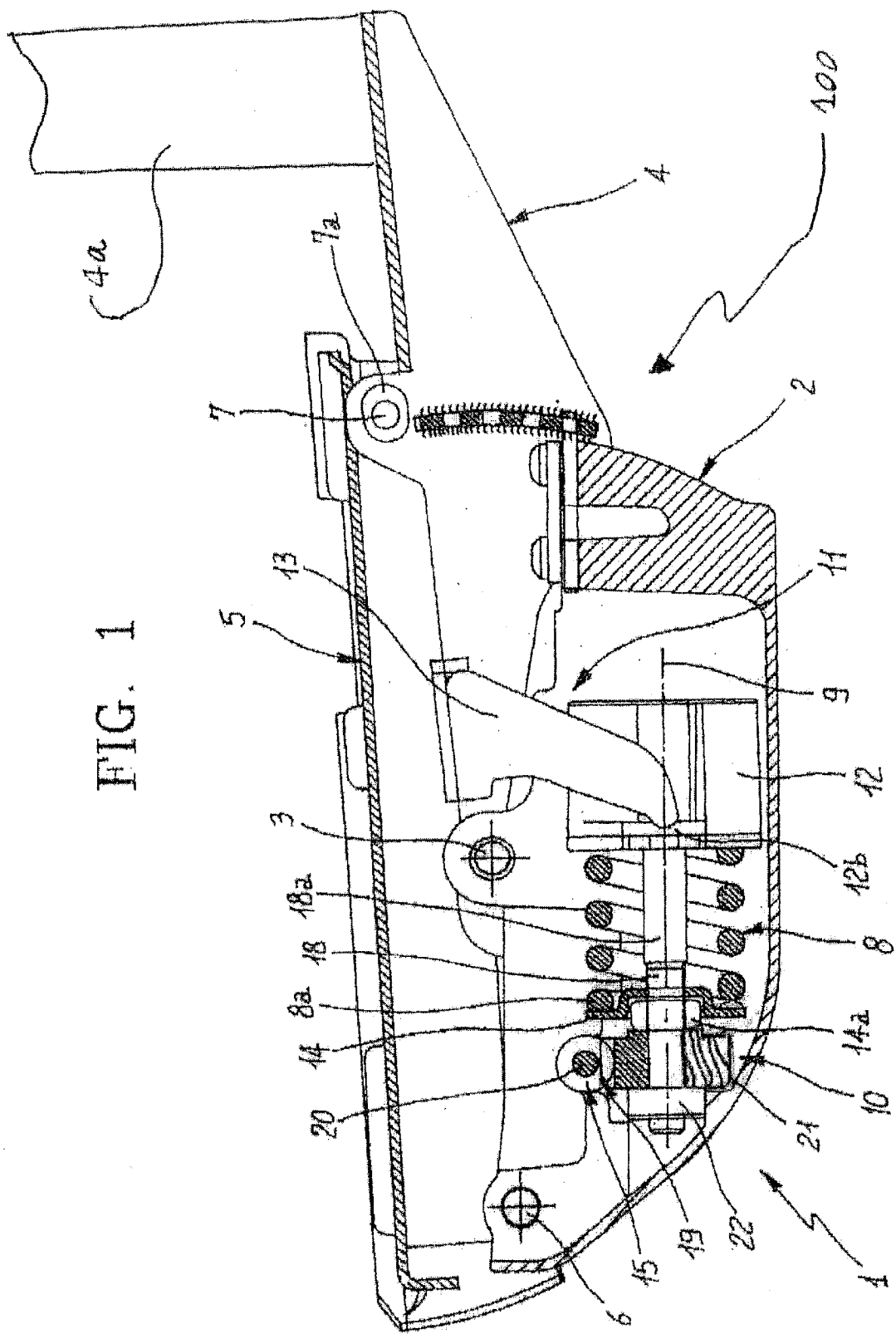
FIG. 1 shows a view in longitudinal section, according to line I—I of FIG. 3, of a reclining device for chairs according to the invention having a reclining back and a seat partially connected to the latter, in a first operating position.
Figure 2:
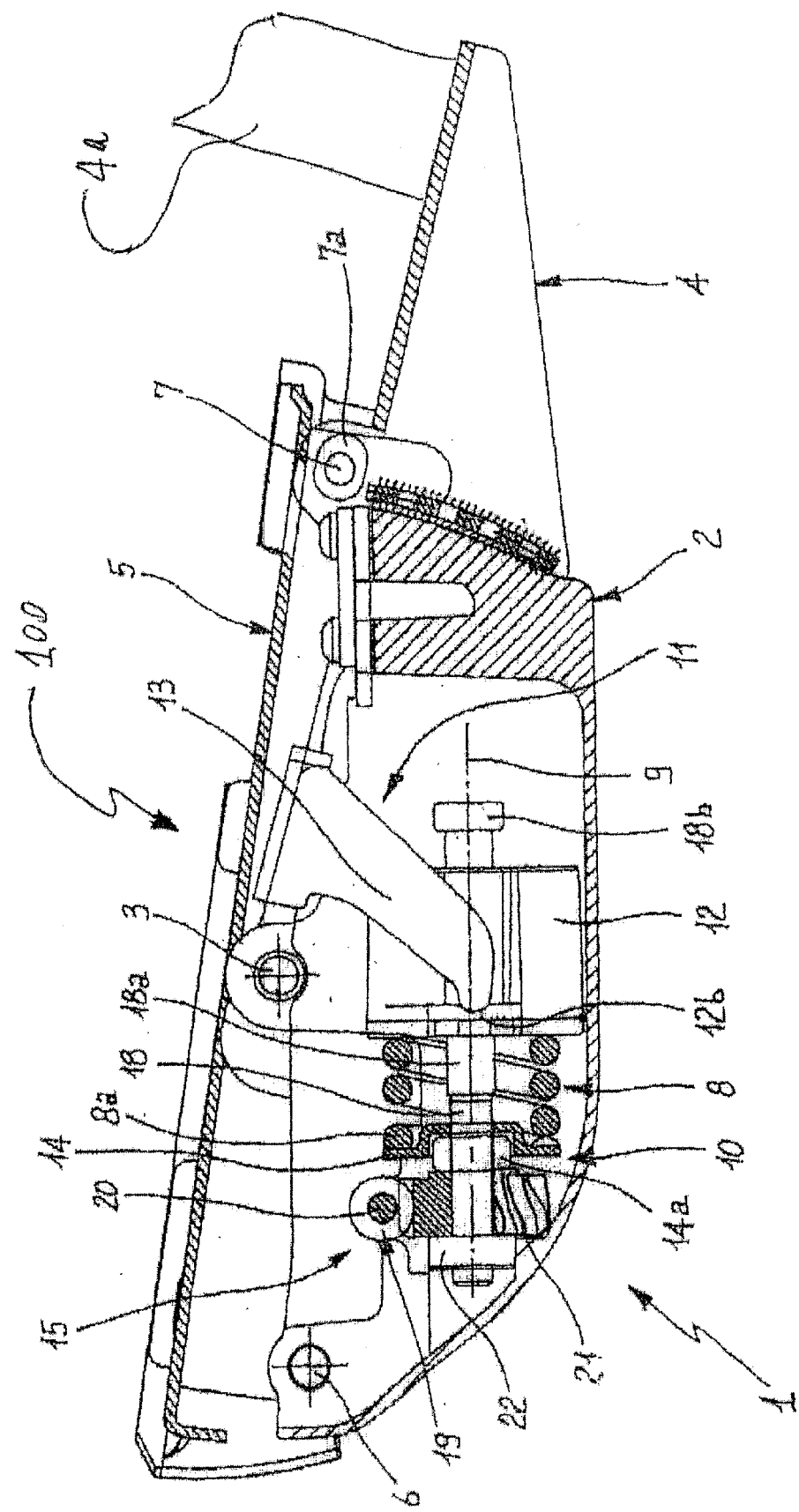
FIG. 2 shows the mechanism of FIG. 1 in a second operating position corresponding to the backward inclination of both back and seat.
Figure 3:
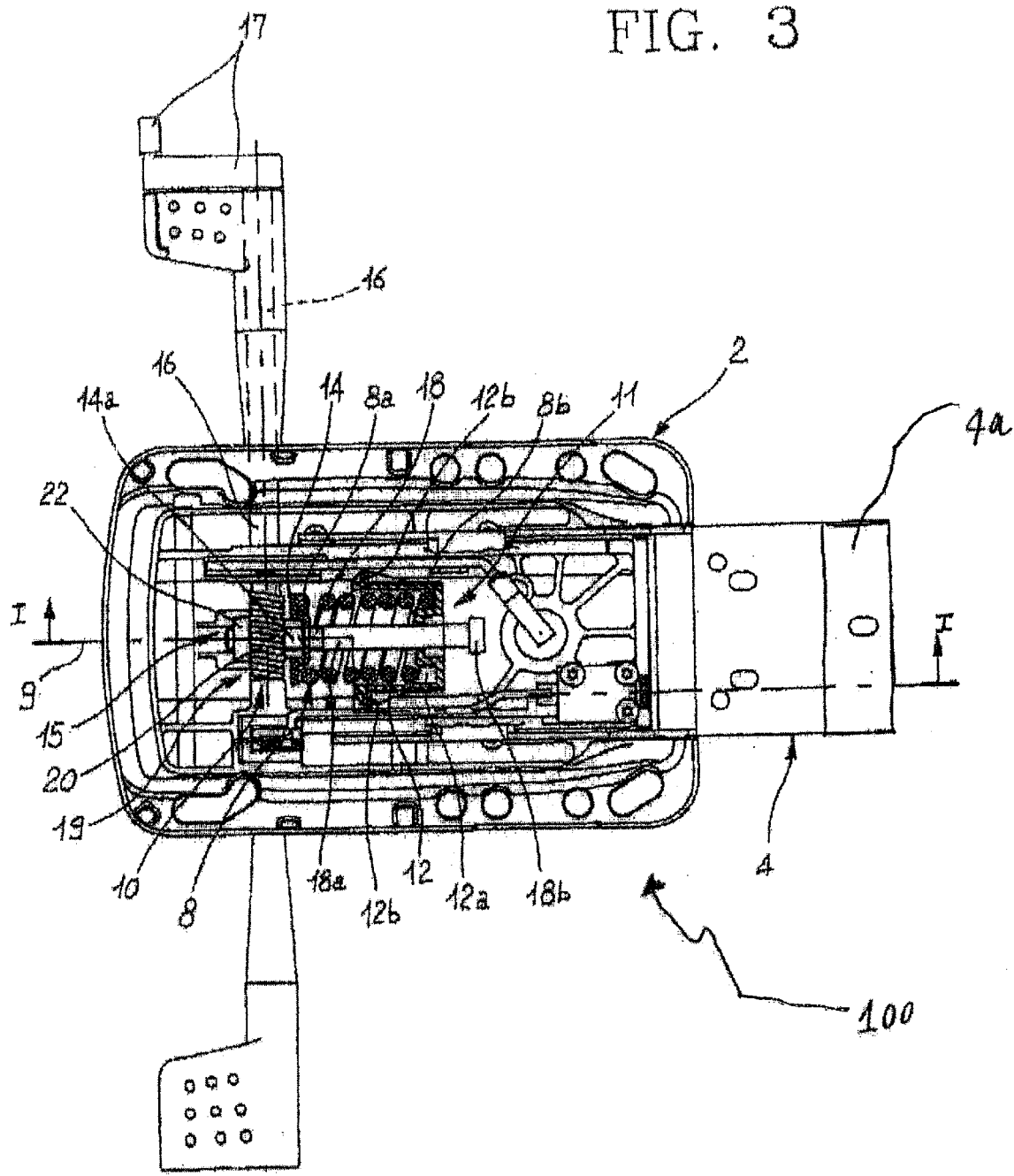
FIG. 3 shows a top view of the reclining device for chairs of FIG. 1.
Figure 4:
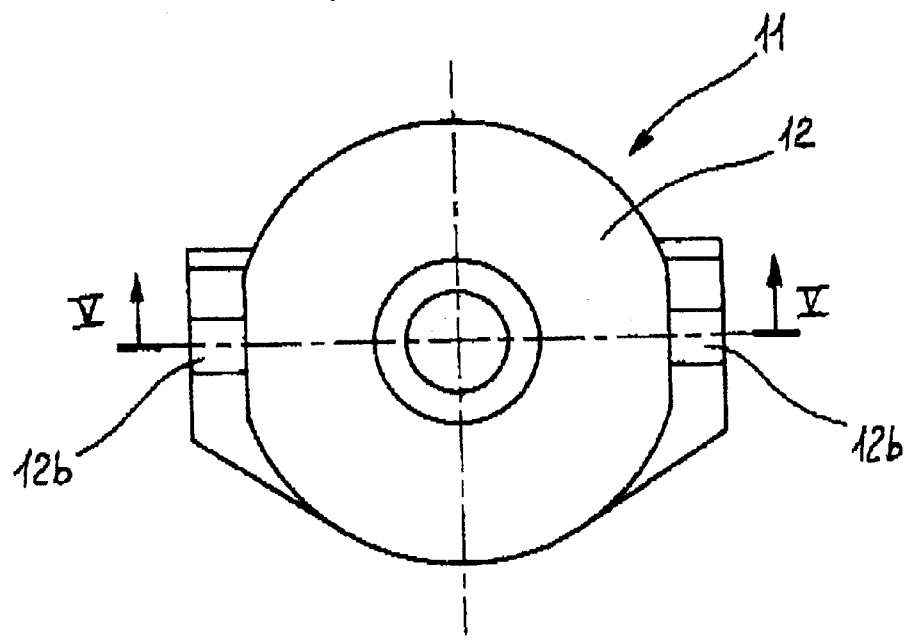
FIG. 4 is a front view of a half-shell element comprised in the reclining device for chairs of FIG. 1.
Figure 5:
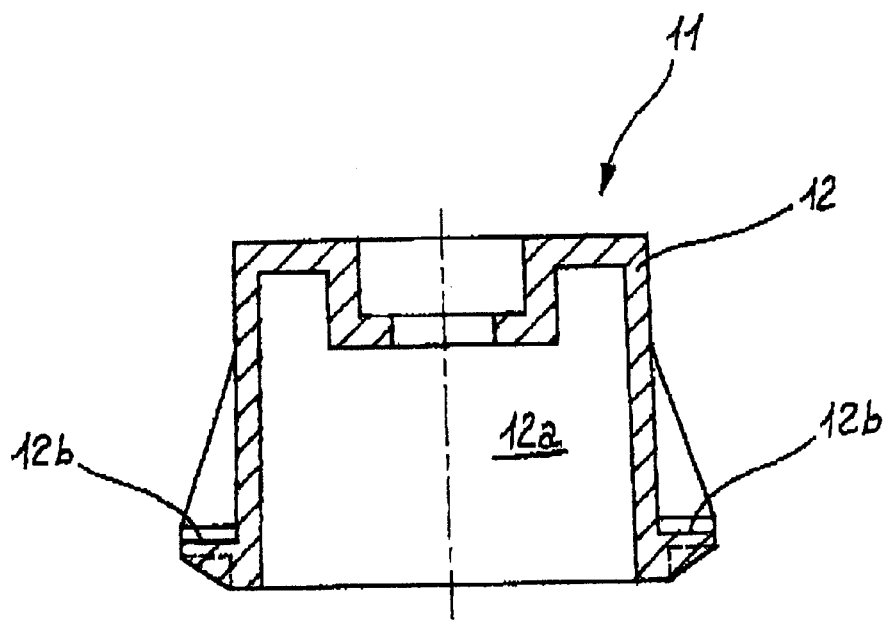
FIG. 5 shows a longitudinal section of the half-shell element of FIG. 4.

With reference to the mentioned figures, a reclining device for chairs according to the invention is generally indicated with the numeral 100.

Said reclining device for chairs is applied to an office chair comprising a primary body 2 adapted to be engaged with an upper end of an upright 4a defining the vertical stand of the chair.

The primary body 2 is turnably engaged with a backrest support element 4 along an oscillation axis 3. At least a seat support element 5 of the chair is located above the primary body 2. In the embodiment shown in the enclosed figures said seat support element 5 is hinged to the primary body 2 according to a first hinging axis 6 located before the oscillation axis 3 and parallel to it, and it is turnably engaged with the backrest support element 4 on a second hinging axis 7 located behind the oscillation axis 3 and parallel to it.

Moreover, said hinging axes 6 and 7, and the oscillation axis 3 are substantially lined up, so as to enable the inclination, with respect to the primary body, both the support element 4 and, to a smaller extent, the seat engaged with the support element 5.

In order to avoid a three-hinge arch which would not enable the reciprocal inclination of said portions, it is necessary to carry out a slot 7a within which one of the hinging points defining the above-mentioned rotation axes can slide.

It is also possible to provide to carry out, instead of the kind of chair disclosed above with synchronous inclination both of the back and of the seat, other kinds of chairs in which for instance also the second hinging axis 7 is integral with the primary body 2 and therefore with the fixed seat, i.e. in "permanent contact" with the latter, or in which the support element of the seat is integral with the support element of the back and the seat can therefore oscillate integrally with the back.

The reclining device for chairs also comprises a mechanism 1 placed between the support element 4, which is integral with the back, and the primary body 2, the mechanism comprising an elastic element with linear strain 8, preferably a cylindrical helical compression spring. The latter has a main direction of development, i.e. its longitudinal axis 9, lying on a plane which is perpendicular to the oscillation axis 3 and a first end 8a which abuts against the primary body 2, though not directly, but advantageously with the interposition of an adjustment group 10 increasing or reducing the reaction force exerted by the elastic element 8, as will be better described below.

Furthermore, the mechanism 1 comprises means 11 to transfer to the elastic element 8 the pressing force pushing the back backwards, said means being located between the backrest support element 4 and a second end 8b of said elastic element 8.

Said transfer means 11 comprise in their turn a half-shell element 12 having a hollow housing 12a housing at least the portion of the elastic element 8 starting from its second end 8b and at least a pushing extension 13 integral with the support element 4. Originally, said half-shell element 12 shows at least an abutment portion 12b for the pushing extension 13, which can place the application point of the pressing force exerted by the support element through said pushing extension, directly on the second end 8b of the elastic element 8, instead of placing it in an area far from the said end.

In further detail, it is provided for two abutment portions 12b located in diametrically opposite positions on the half-shell element 12 for the same number of pushing extensions 13.

Advantageously, the abutment portions 12b are placed outside near the entry of the hollow housing 12a, so as to exploit the whole length of the half-shell element 12 in order to move the action point of the force coming from the pushing extension 13 towards the first end 8a as much as possible.

The adjustment group 10 comprises a reference element 14 abutting against the first end 8a of the elastic element 8 and moving along a direction of translation corresponding to the direction of the elastic strain of said elastic element 8, i.e. the longitudinal axis 9. The reference element 14 is operated by control means 15 which can vary its position in order to change the compression on the elastic element 8 and thus its reaction force.

The control means 15 consist of a shaft 16 which is turnably engaged with the primary body 2 parallel to the oscillation axis 3, and which can be operated by means of a handling knob 17 laterally projecting from the seat. A handling screw 18 is coupled with the reference element 14 by means of a nut 14a integral with said element, and it develops along said direction of translation.

The rotatory motion is transmitted from the shaft 16 to the handling screw 18 by means of an oblique gear 19 consisting of a worm 20 integral with the shaft 16 and of a helical toothed wheel 21 connected to said handling screw 18.

Furthermore, the handling screw 18 reaches on one side beyond the helical toothed wheel 21 so as to support a bearing 22 which is placed between said wheel and the primary body to enable its low-friction rotation, and has on the other side an unthreaded stem portion 18a going through the elastic element 8.

Said stem portion 18a is slidingly coupled with the half-shell element 12 and has an end head 18b constituting a stroke end for said half-shell element when the elastic element 8 is stretched and is not pressed by the pushing extension 13.

In practice, the stem portion 18a defines a guide for the translation of the half-shell element 12 along the longitudinal direction 9 of the elastic element 8 during the axial deformations of the latter.

The invention shows important advantages.

As a matter of fact, the reclining device for chairs and the chair with said reclining device according to the invention allows to place the elastic element in the most suitable position, for instance in order to leave suitable spaces to house the group for the adjustment of the reaction force of said elastic element, so as to simplify the operation of the handling knob, since said knob can be arranged laterally with respect to the chair, in a comfortable position with an easy access.

Moreover, it should be pointed out that by suitably choosing the length of the half-shell element into which the elastic element is partially inserted, it is possible to locate the latter also horizontally if this is deemed as necessary to optimize the overall dimensions and the functional features of the mechanism as a whole.

Finally, it should be observed that the present invention can be easily carried out and that also the costs related to its implementation are not very high.

What is claimed is:

1. Reclining device for chairs comprising: a primary body (2); a backrest support element (4) turnably engaged with the primary body (2) on an oscillation axis (3); a mechanism (1); said mechanism (1) comprising at least an elastic element (8) having a longitudinal axis (9) of linear strain, a first end (8a) engaged with the primary body (2) and a second end (8b); transferring means (11) for transferring to the elastic element (8) a force acting on the backrest support element (4); said transferring means (11) being placed in contact with the second end (8b) of the elastic element (8) and with the backrest support element (4) and comprising a half-shell element (12) movable along said axis (9) and at least one pushing extension (13) integral with said backrest support element (4); said half-shell element (12) defining a hollow housing (12a) which engages with the second end (8b) and comprising at least one abutment portion (12b) for the pushing extension (13); said at least one abutment portion (12b) being placed between the second end (8b) and the first end (8a) of the elastic element (8) and being spaced from the second end (8b).

2. Reclining device for chairs according to claim 1, wherein said at least one abutment portion (12b) is defined by an extension of said half-shell element (12).

3. Reclining device for chairs according to claim 1, wherein said abutment portions (12b) are two and are placed in diametrically opposite positions on said half-shell element (12).

4. Reclining device for chairs according to claim 1, wherein the mechanism (1) also comprises an adjustment group (10) connected with the elastic element (8).

5. Reclining device for chairs according to claim 4, wherein said adjustment group (10) comprises a reference element (14) movable along the axis (9) of linear strain of said elastic element (8), and abutting against the first end (8a) of said elastic element (8), and control means (15) acting on said reference element (14) and changing its position.

6. Reclining device for chairs according to claim 5, wherein said control means (15) comprise: a shaft (16) turnably engaged with the primary body (2), parallel to the oscillation axis (3) and operated by means of a handling knob (17) laterally projecting from the chair; a handling screw (18) coupled with said reference element (14) and developing along said axis (9), and an oblique gear (19) acting on said handling screw (18).

7. Reclining device for chairs according to claim 6, wherein said handling screw (18) has an unthreaded stem portion (18a) developing through said elastic element (8), slidingly coupled with said half-shell element (12) and defining a guide for the movement of the half-shell element (12) along the axis (9).

8. Reclining device for chairs according to claim 6, wherein said oblique gear (19) consists of a worm (20) integral with said shaft (16) and of a helical toothed wheel (21) integral with said handling screw (18).

9. Reclining device for chairs according to claim 1, wherein the reclining device also comprises a seat support element (5) hinged to said primary body (2) along a first hinging axis (6) and to said backrest support element (4) on a second hinging axis (7); the first hinging axis (6) being arranaed parallel and before said oscillation axis (3); said second hinging axis (7) being arranged parallel and behind said oscillation axis (3); said oscillation axis (3) and said hinging axes (6 and 7) being substantially lined up.

10. Reclining device for chairs according to claim 9, wherein said seat support element (5) is integral with said primary body (2).

11. Reclining device for chairs according to claim 9, wherein said seat support element (5) is integral with said backrest support element (4).

12. Chair comprising a reclining device in accordance with any of claims 1 to 11.

* * * * *